United States Patent [19]

Boverie et al.

[11] Patent Number: 5,531,201

[45] Date of Patent: Jul. 2, 1996

[54] METHOD OF SUPPRESSING A PINGING PHENOMENON AFFECTING THE OPERATION OF AN INTERNAL COMBUSTION ENGINE

[75] Inventors: Serge Boverie, Plaisance du Touch; Bernhard Demaya, Valence d'Agen; André Titli, Balma, all of France

[73] Assignee: Siemens Automotive S.A., Toulouse Cedex, France

[21] Appl. No.: 302,900

[22] PCT Filed: Mar. 17, 1993

[86] PCT No.: PCT/EP93/00627

§ 371 Date: Sep. 19, 1994

§ 102(e) Date: Sep. 19, 1994

[87] PCT Pub. No.: WO93/19293

PCT Pub. Date: Sep. 30, 1993

[30] Foreign Application Priority Data

Mar. 26, 1992 [FR] France ................... 92 03645

[51] Int. Cl.$^6$ ................ F02P 5/152; G01L 23/22
[52] U.S. Cl. ............. 123/425; 73/35.04; 364/431.08
[58] Field of Search .................... 123/425, 435, 123/625; 364/431.08; 73/35

[56] References Cited

U.S. PATENT DOCUMENTS 5,146,777  9/1992  Polito et al. ................... 73/35
5,201,292  4/1993  Grajski et al. ................ 123/425
5,321,973  6/1994  Sogawa ......................... 123/425

FOREIGN PATENT DOCUMENTS 0399068  11/1990  European Pat. Off. .
2163812  5/1986  United Kingdom .

OTHER PUBLICATIONS

Patent Abstracts of Japan, vol. 14, No. 473, (M1035) 16 Oct. 1990, & JP-A-21 88 676 (NOK Corp) 24 Jul. 1990.

Patent Abstracts of Japan, vol. 13, No. 335, (M–856) 27 Jul. 1989, & JP-A-A 11 13 574 (Nissan Motor Co. Ltd.) 02 May 1989.

Patent Abstracts of Japan, vol. 13, No. 311, (M851) 17 Jul. 1989 & JP-A-11 00 377 (Mitsubishi Motors Corp) 18 Apr. 1989.

Primary Examiner—Andrew M. Dolinar
Attorney, Agent, or Firm—Hill, Steadman & Simpson

[57] ABSTRACT

The instantaneous energy of the pinging phenomenon is measured, a quantity ($R_i$) dependent on the instantaneous value of this same measurement is calculated, a sliding average value ($R_m$) of the quantity ($R_i$) weighted by a forget factor is calculated and a correction ($R_A$) of the ignition advance angle is calculated from an inference engine marshalling "fuzzy" logic rules enabling the membership class of ($R_a$) to be established from those of ($R_i$) and of ($R_m$).

5 Claims, 3 Drawing Sheets

FIG.4
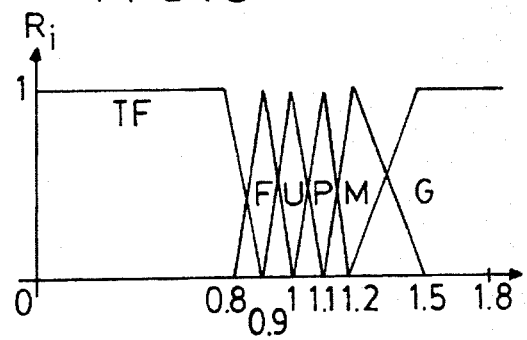
FIG.5
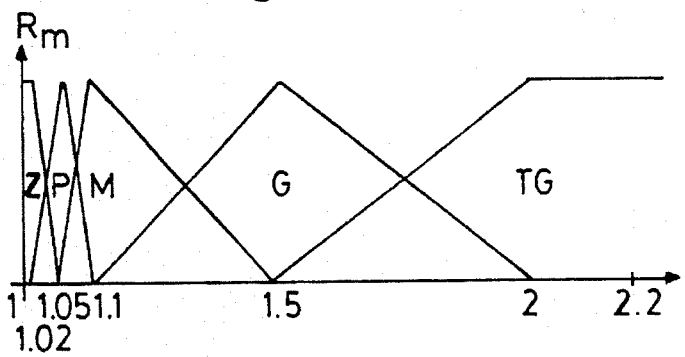
FIG.6
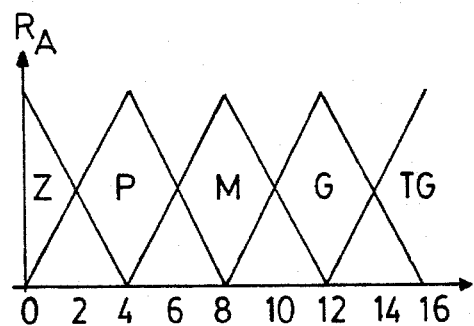
FIG.7

METHOD OF SUPPRESSING A PINGING PHENOMENON AFFECTING THE OPERATION OF AN INTERNAL COMBUSTION ENGINE

BACKGROUND OF THE INVENTION

The present invention relates to a method of suppressing a pinging phenomenon affecting the operation of an internal combustion engine and, more particularly, to such a method calling on a "fuzzy" logic control of an engine operation parameter.

It is known that certain abnormal combustions of the air/fuel mixture introduced into an internal combustion engine give rise to high-pressure waves and hence to an acoustic noise known as "pinging". When the latter is intense, it may result in impairments of the engine, such as erosion of the cylinder head and pistons, fractures of the piston lands and rings, failure of the cylinder head gasket or deterioration of the valves, for example.

As known for example from the publication "Adaptive Spark Control with Knock Detection" published by the Society of Automotive Engineers under the number 840447, the operating diagram of a conventional device designed to prevent such deteriorations of the engine under the effect of the pinging phenomenon has been represented in FIG. 1 of the attached drawing. The device comprises a pinging sensor 1, of the accelerometer type for example, fixed to the engine so as to be sensitive to the pinging arising in each cylinder of the engine, the sensor delivering a signal processed in a conditioning stage 2 before being delivered to means 3 for calculating an ignition advance reduction $R_A$, as a function of various strategies, these means correcting, as a function of the calculated reduction, the instant of ignition of the engine spark plugs located in the cylinders in which the pinging was detected. It is known that such a reduction has the effect of suppressing the pinging. When the latter has disappeared, the calculating means permit a return of the ignition advance to the nominal value.

More precisely, in accordance with a current technique used for detecting pinging, during each engine cycle, the average energy of the pinging, in each of the cylinders in which it occurs, is calculated and this average energy (clqmoy) is compared with the instantaneous pinging energy (valclq) as illustrated by the graph of FIG. 2. A band separating a region situated to its right and in which pinging is supposed to exist from a region situated to its left in which pinging is supposed not to exist, has been represented in this graph. The separation band has a slope (clqgn) and an origin abscissa (clqof) for its right boundary.

Hence, pinging is supposed to be present if:

clqmoy<(valclq−clqof)×clqgn

In the presence of pinging thus detected, the device of FIG. 1 orders a sizeable advance reduction $R_A$ (of about 7° for example) in the cylinder which is pinging, in the following engine cycle, this reduction possibly being repeated once should the pinging persist, the instant of ignition being thus brought closer to the top dead centre (TDC) by 14° in total. The return to the nominal value of ignition advance takes place later, after the pinging disappears, at a rate of approach of about 1° every 2.5 seconds for example. Other corrections, applied more "slowly", may be provided for in order to tune the ignition for the fouling and ageing of the engine, for the loss in efficiency of the cooling circuit, for the quality of the fuel, etc.

The technique described above for suppressing or lessening pinging has various disadvantageous limitations. As was seen earlier in connection with the graph of FIG. 2, in accordance with this technique, detection of pinging is of the "all-or-nothing" type: pinging does or does not exist and hence no distinction is made between nascent pinging and intense pinging. Therefore, the amplitudes of the advance reductions due to the corrections described above are the same, whatever the intensity of the pinging. This results in impairment of the performance of the engine, in particular as regards torque or fuel consumption, due to a non-optimal setting of the angle of ignition advance.

With the introduction of fuzzy logic control, several attempts have been made to implement this technology in processes where old control techniques could be improved, particularly by the "smoothing" brought by fuzzy control. Japanese published application JP-A-1100377 suggests use of fuzzy theory to control ignition timing in idling conditions, based upon engine rotational speed. More generally, JP-A-1113574 proposes the use of fuzzy logic control for any function of an engine controller (ignition timing, air/fuel ratio control, . . . ) with capability to change the membership function according to detection of transient conditions. More recently, JP-A-2188676 teaches the use of fuzzy inference in obtaining a lead angle, for correcting ignition time, from engine load, speed and knock information, to cope with engine load changes.

SUMMARY OF THE INVENTION

The purpose of the present invention is therefore to provide a method of suppressing a pinging phenomenon affecting the operation of an internal combustion engine, which does not have the disadvantages mentioned above and hence which allows the best possible adjustment of the advance reductions to be applied in the pinging correction phase and minimization of the application times of these reductions.

The purpose of the present invention is also to provide such a method which enables the fuel consumption of the engine to be lessened while protecting the latter from impairment due to pinging.

These purposes of the invention, as well as others which will emerge on reading the description which will follow, are achieved with a method of suppressing a pinging phenomenon affecting the operation of an internal combustion engine, by correcting at least one of the quantities from the group formed by the ignition advance angle of an air/fuel mixture introduced into the engine, the composition of this mixture and the energy of the ignition spark, a method according to which the instantaneous energy of the pinging phenomenon is measured and a quantity ($R_i$) dependent on the instantaneous value of this measurement is calculated. According to the invention, a sliding average value ($R_m$) of the quantity ($R_i$) is calculated, weighted by a forget factor and the correction $R_A$ to be applied is calculated from predetermined relations gleaned from a set of such relations and selected as a function of the instantaneous values of the quantity ($R_i$) and of its weighted sliding average ($R_m$).

In accordance with a preferred implementation of the method according to the invention, the quantity $R_i$ is calculated from the expression:

$$R_i = \frac{valclq - K_1}{clqmoy} \times K_2$$

where (valclq) is the instantaneous value of the measurement of the energy of the pinging phenomenon, (clqmoy) is a sliding average value of this measurement, $K_1$ and $K_2$ are constants.

This formulation of the quantity $R_i$ enables the pinging phenomenon to be quantified and not its presence or absence simply to be noted as in the prior art.

Furthermore in accordance with the invention, the quantity $R_i$ is sampled and a weighted sliding average $R_m$ of the quantity $R_i$ is calculated such that:

$$R_m = \sum_{j=1}^{j=N} \frac{R_i(j)}{N-j+1}$$

is the sum of the N latest samples acquired $R_i(j)$, each weighted by a forget factor $(N-j+i)^{-1}$.

In accordance with an advantageous characteristic of the method according to the invention, the quantity $R_i$ and its average value $R_m$ are converted into fuzzy variables and the correction $R_A$ is gleaned from an inference engine supplied with $R_i$ and $R_m$.

Thus, by using "fuzzy" logic in the method in accordance with the invention, an advantageous characteristic of this logic is profited from which enables a person skilled in the art, expert in pinging suppression, to implement suppression rules gleaned from his experience, so doing in a simple manner requiring short development times. Fuzzy logic makes it possible moreover to procure, from the method in accordance with the invention, good performance as regards response time, precision and "robustness".

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 4 is a table gathering together the rules constituting an inference engine used in the method in accordance with the invention and illustrated in FIG. 3;

FIGS. 5, 6 and 7 represent fuzzy collections of membership classes and of degrees of membership of these classes of fuzzy variables $R_i$, $R_m$ and $R_A$ respectively used in the present invention.

DESCRIPTION OF THE PREFERRED EMBODIMENT

The quantities $R_i$ and $R_m$ which are the basis of the method of suppressing pinging in accordance with the invention will firstly be defined.

Figure 1:
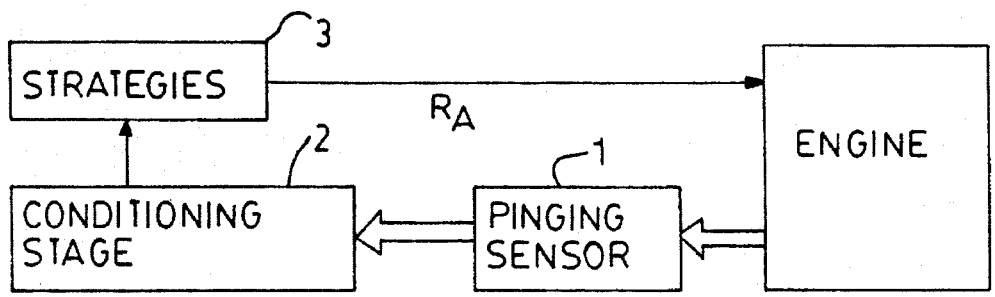
FIG. 1 is an operating diagram of a conventional method of correcting ignition advance with a view to suppressing a pinging phenomenon.

The variable quantity $R_i$ is calculated through the equation:

$$R_i = \frac{valclq - clqof}{clqmoy} \times clqgn$$

where clqof is an experimentally determined "offset" value, clqgn is an experimentally determined gain, valclq is an instantaneous value of pinging energy measured at the output of the conditioning stage 2 of FIG. 1, clqmoy is a sliding average value of the instantaneous pinging energy signal. As is well known in the art, in the case of a sampled system, we put for example:

$$clqmoy_i = clqmoy_{i-1} + K(valclq_i - clqmoy_{i-1})$$

where K is a weighting coefficient less than 1, $clqmoy_i$ is the current value of average energy, $clqmoy_{i-1}$ is the old value of average energy.

The purpose of calculating the quantity clqmoy is to take into account the average energy of the background noise which could otherwise more or less mask the pinging phenomenon.

Figure 2:
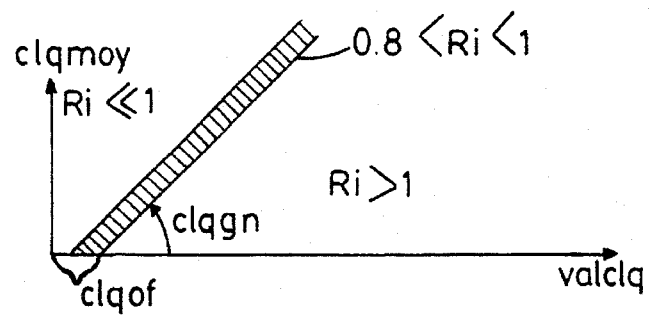
FIG. 2 is a graph discussed in the preamble of the present description, which will be returned to later in order to explain how the energy of a pinging phenomenon is quantified in accordance with the present invention.

The quantity $R_i$ being thus defined, we come back to the graph of FIG. 2 in order to provide a more concrete expression thereof. Three zones have been defined in this graph, corresponding to different values of $R_i$. Two of these zones are separated by the band of slope clqgn. This band corresponds to $0.8 < R_i < 1$. For the points of the space situated between this band and the axis for the values of (clqmoy), the quantity $R_i$ is much less than 1. It is then supposed that no pinging exists. The space situated between the band of slope clqgn and the axis for the values of (valclq) corresponds to a zone in which $R_i$ is larger than 1 and hence in which pinging is present. The band which separates these two zones constitutes a zone of uncertainty.

It appears that the definition adopted for $R_i$, in accordance with the present invention, makes available a quantity quantifying the pinging in a progressive and not "all-or-nothing" manner contrary to what is done customarily in the prior art. This quantity thus makes it possible to respond to the pinging phenomenon with ignition advance corrections which follow as closely as possible those which are required to suppress pinging, without costly energy excesses insofar as corrections of the angle of ignition advance with respect to the optimal value of this angle reduce the output torque of the engine by comparison with the optimal torque which it can deliver.

The invention is preferably implemented in a sampled device for digital control making available successive samples of the quantity $R_i$. In accordance with the invention, a second quantity $R_m$ is defined, representing the weighted sum of N samples of the variable $R_i$. In accordance with the invention, the weighting is carried out in such a way that the most recent variable $R_i$ taken into account in the average has the most significant weight whereas the oldest variable $R_i$ has the lowest weight. In other words, the more recent the sample, the larger its significance in the value of $R_m$. The value $R_m$ thus constitutes an "average weighted by forget factor". It may be expressed mathematically with the aid of the following recurrence equation:

$$R_m = \sum_{j=1}^{j=N} \frac{R_i(j)}{N-j+1}$$

where N represents the number of samples over which the average is calculated, j is an index running from 1 to N, $R_i$ is the instantaneous energy of pinging, calculated as indicated above, j=N being the most recent sample and j=1 the oldest sample.

If the expression given above for $R_m$ is expanded, we obtain:

$$R_m = \frac{R_i(N)}{1} + \frac{R_i(N-1)}{2} + \ldots + \frac{R_i(2)}{N-1} + \frac{R_1(1)}{N}$$

This expanded expression demonstrates that the quantity $R_m$ exhibits a memory effect over a horizon defined by the N latest samples acquired. $R_m$ thus constitutes a sliding average weighted by a forget factor $(N-j+1)^{-1}$. This memory effect enables pinging phenomena having different histories to be processed differently depending on, for example, whether this history contains only one isolated ping or several successive pings, of average amplitude for example. Such successive pings may occur when the correction applied is not big enough. Now, as will be seen later, the level of correction of ignition advance in accordance with the invention with a view to suppressing pinging is, among other things, dependent on the value of the variable $R_m$. An increase in the value of this variable then brings about an increase in the level of correction.

The variable $R_m$ offers another attraction in that, contrary to the variable $R_i$, it tends towards zero only progressively. Since pinging is a self-sustaining phenomenon, a correction of advance must be maintained for a certain time, as the variable $R_m$ advantageously allows, while so doing so that the duration of this correction is proportional to the level of pinging encountered.

Having thus defined the variables $R_i$ and $R_m$ used in the method in accordance with the invention in order 10 to account for the pinging phenomenon, a method will now be described for "fuzzy" logic control of the correction of advance required to suppress this phenomenon.

Figure 3:
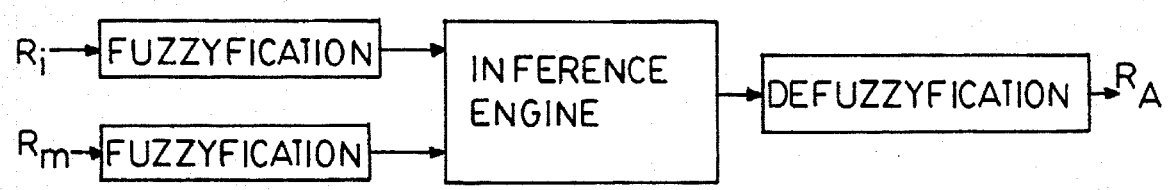
FIG. 3 is an operating diagram of the method of suppressing pinging in accordance with the present invention, implemented with the aid of fuzzy logic.

This method aims to calculate an advance reduction $R_A$ as a function of observations made on the quantities $R_i$ and $R_m$. As illustrated in FIG. 3, the "fuzzy" control necessitates a prior operation of coding the variables $R_i$ and $R_m$ termed "fuzzyfication", the "fuzzy" variables $R_i$ and $R_m$ thus obtained being processed in an inference engine constituted by a collection of fuzzy logic rules. From this processing is gleaned a "fuzzy" expression for the applied correction $R_A$, which must be "defuzzyfied" in order to glean therefrom a usable specified value of the ignition advance correction to be applied.

The fuzzyfication operation makes it possible to determine each input variable's $R_i$ and $R_m$ degree of membership of various membership functions represented in FIG. 5 and 6 respectively.

In this way six membership classes are defined for the variable $R_i$, labelled TF, F, U, P, M, G in FIG. 5 in which the corresponding degrees of membership have been represented, consisting (except for TF and G) of triangular graph functions μ centred on the middles of the associated classes. Of course, membership functions exhibiting different forms could be chosen, as is well known in "fuzzy" control. We denote by:

TF the "very weak" membership class,

F the "weak" membership class,

U the "unit" membership class,

P the "small" membership class,

M the "average" membership class,

G the "large" membership class.

As represented in FIG. 6, the variable $R_m$ forms the subject of analogue processing, with definition of five membership classes: Z (zero), P (small), (average), G (large), and TG (very large).

As represented in FIG. 7, the output variable $R_A$ is labelled with respect to five membership classes (Z, P, M, G, TG) covering, as for the membership classes associated with the variables $R_i$ and $R_m$, partially overlapping ignition advance correction domains. In this way, for example, membership class M of $R_A$ extends from 4° to 12° with a triangular membership function centered on 8°, membership classes P and G each overlapping half the domain of class M.

The membership functions represented in FIGS. 5 to 7 define the degrees of membership $\mu_{Ri}$, $\mu_{Rm}$ and $\mu_{RA}$ of each of the defined membership classes for variables $R_i$, $R_m$ and $R_A$ respectively. The triangular membership functions represented, chosen merely by way of example, thus establish degrees of membership varying uniformly between 0 and 1, with a maximum value 1 at the middle of each membership class.

A table which defines the fuzzy logic rules to be applied in order to glean the advance reduction $R_A$ to be applied from the observations made on $R_i$ and $R_m$ has been represented in FIG. 4. Such a collection of rules is conventionally called an "inference engine". The inference engine, composed of rules established on the basis of the experience of those skilled in the art, makes it possible to choose in real time the rules applicable to the determination of $R_A$, corresponding to the membership classes to which, at a given instant, the variables $R_i$ and $R_m$ belong. Since these variables may belong simultaneously to several membership classes, several rules may be applied simultaneouly, according to the principles of fuzzy logic, as will be seen in the following example.

Figure 8:
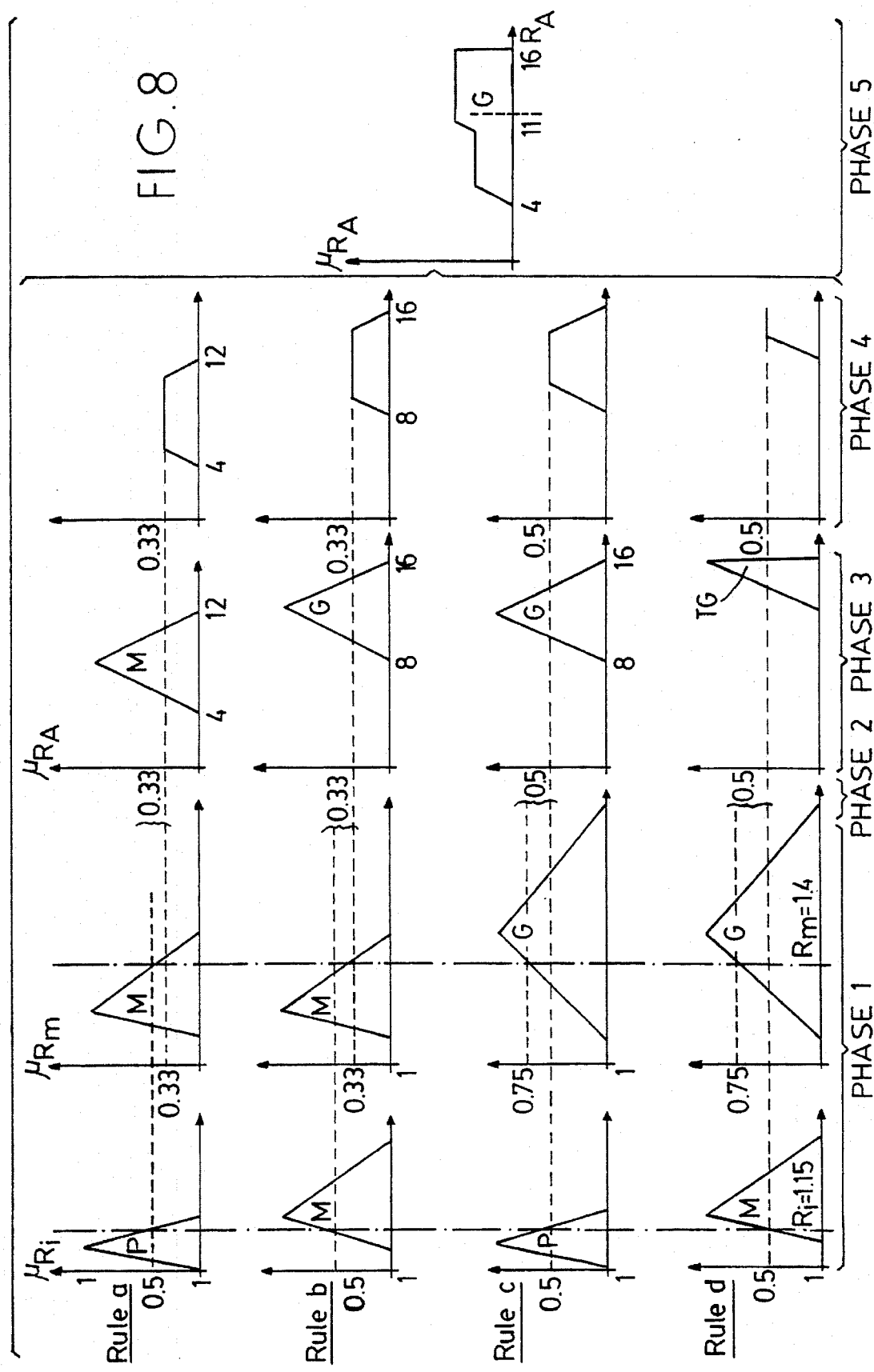
FIG. 8 illustrates a particular example calculation of the ignition advance angle established under fuzzy logic, in accordance with the present invention.

The collection of fuzzy logic operations executed on the basis of four rules a, b, c, d of the inference engine and activated by particular values of $R_i$ and $R_m$ chosen by way of example, has been represented in FIG. 8.

The results which ensue from each of the activated rules are weighted by the degree of membership of the variables $R_i$ and $R_m$ (phase 1, FIG. 8). Next, an operation of the logic "AND" type (phase 2) and an operation of the "THEN" type (phase 3) which for each rule defines a new membership class of the variable $R_A$ (phase 4) are carried out. The set of membership classes of $R_A$ thus obtained is next aggregated ("OR" function) thus to provide the global membership class of $R_A$ corresponding to the particular inputs $R_i$ and $R_m$ (phase 5).

It is then necessary to establish a specified value of the correction $R_A$ of the ignition advance angle suitable for making the detected pinging disappear. To do this, the centre of gravity of the membership class aggregation produced in phase 5 may be calculated, for example. The abscissa $R_A$ of this centre of gravity is next marked on the horizontal axis.

The procedure for establishing the value $R_A$ will now be illustrated with the aid of an example. In accordance with this example, illustrated in FIG. 8, a situation exists in which, on the basis of the signal delivered by the pinging sensor 1 (see FIG. 1), instantaneous values of $R_i$ and $R_m$ have been established such that:

$R_i(t)=1.15$ $R_m(t)=1.4$ in FIGS. 5 and 6 it is then observed that:

$R_i(t)$ belongs to classes P and M, $R_m(t)$ belongs to classes M and G.

It then emerges from the table of FIG. 4 that the fuzzy logic rules which are activated are as follows:

rule a: if $R_i \epsilon P$ and if $R_m \epsilon M$, then $R_A \epsilon M$ rule b: if $R_i \epsilon M$ and if $R_m \epsilon M$, then $R_A \epsilon G$ rule c: if $R_i \epsilon P$ and if $R_m \epsilon G$, then $R_A \epsilon G$ rule d: if $R_i \epsilon M$ and if $R_m \epsilon G$, then $R_A \epsilon TG$ the logic functions mentioned above make it possible to calculate, for each rule, the degree of membership of $R_A$ of the corresponding class. To do this, the degree of membership of $R_A$ of the class defined by the rule, is calculated in phase 2 by the operation:

$$min[\mu_{R_i}(R_i(t)), \mu(R_m(t))]$$

The membership classes defined in phase 3 are then clipped to the value of the degree of membership thus calculated (see phase 4). The four membership classes thus clipped are next aggregated in phase 5 by a logic "OR" function. The centre of gravity G of the aggregation range thus obtained has an abscissa which makes it possible to define a specified value of the ignition advance correction $R_A$ ($R_A$=1120 in the example represented) calculated in accordance with the present invention in order to suppress a previously detected pinging.

Of course, the invention is not limited to the embodiment described and represented, which has been given merely by way of example. Thus, quantities other than the angle of ignition advance could be acted upon in order to attempt to eliminate pinging, for example the composition of the air/fuel mixture or the energy of the ignition spark.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for suppressing a pinging phenomenon affecting operation of an internal combustion engine, by correcting at least one of ignition advance angle of an air/fuel mixture introduced into the engine, composition of this mixture and energy of an ignition spark, comprising the steps of: measuring an instantaneous energy of the pinging phenomenon and calculating a quantity dependent on the instantaneous value of this measurement the quantity being calculated from the expressions:

$$R_i = \frac{valclq - K_1}{clqmoy} \times K_2$$

where $R_i$ is the quantity, valclq is the instantaneous value of the measurement of the energy of the pinging phenomenon, and clqmoy is a sliding average value of this measurement, and $K_1$ and $K_2$ are constants; calculating a sliding average value of the quantity, weighted by a forget factor; and calculating a correction to be applied from predetermined relations derived from a set of such relations and selected as a function of the instantaneous values of the quantity and of the weighted sliding average, 2. The method according to claim 1, wherein the quantity is sampled and a weighted sliding average of the quantity is calculated such that:

$$R_m = \sum_{j=1}^{j=N} \frac{R_i(j)}{N-j+1}$$

where, $R_i$ is the quantity and $R_m$ is the sliding average that is the sum of the N latest samples acquired, each weighted by a forget factor $(N-j+i)^{-1}$.

3. A method for suppressing a pinging phenomenon affecting operation of an internal combustion engine, by correcting at least one of ignition advance angle of an air/fuel mixture introduced into the engine, composition of this mixture and energy of an ignition spark, comprising the steps of: measuring an instantaneous energy of the pinging phenomenon and calculating a quantity dependent on the instantaneous value of this measurement; calculating a sliding average value of the quantity, weighted by a forget factor; and calculating a correction to be applied from predetermined relations derived from a set of such relations and selected as a function of the instantaneous values of the quantity and of the weighted sliding average, the quantity and the average value being converted into "fuzzy" variables and the correction is derived from an inference engine supplied with the quantity and the average value.

4. The method according to claim 3, wherein the inference engine is defined by the table:

|    | Ri |    |    |    |    |    |
|----|----|----|----|----|----|----|
| Rm | TF | F  | U  | P  | M  | G  |
| ZE | ZE | ZE | ZE |    |    |    |
| P  | ZE | P  | M  | M  |    |    |
| M  | P  | M  | M  | M  | G  |    |
| G  | M  | G  | G  | G  | TG | TG |
| TG | G  | TG | TG | TG | TG | TG | where $R_i$ is a fuzzy variable for the quantity, where $R_m$ is a fuzzy variable for the sliding average, and where TF, F, U, P, M, G, ZE, and TG are membership classes and wherein the inference engine is further defined by predetermined membership functions of the fuzzy variables for the quantity and the sliding average to membership classes TF, F, U, P, M and G and ZE, P, M, G and TG respectively, instantaneous values of the fuzzy variables for the quantity and the sliding average determining rules of this table which condition a thereby deduced fuzzy correction to at least one membership class of the membership classes ZE, P, M, G and TG.

5. The method according to claim 4, wherein the correction is an ignition advance correction of the ignition advance angle, and wherein the method further comprises deriving a numerical value of the ignition advance correction from the value of a fuzzy quantity for the correction by aggregating the membership classes of the fuzzy quantity for the correction.

* * * * *